United States Patent
Kirkby et al.

(10) Patent No.: US 9,449,326 B2
(45) Date of Patent: Sep. 20, 2016

(54) WEB SITE ACCELERATOR

(75) Inventors: Stephen Denis Kirkby, Unley Park (AU); Matthew Symons, Oakland, CA (US)

(73) Assignee: ACCENTURE GLOBAL SERVICES LIMITED, Dublin (IE)

(*) Notice: Subject to any disclaimer, the term of this patent is extended or adjusted under 35 U.S.C. 154(b) by 608 days.

(21) Appl. No.: 12/761,799

(22) Filed: Apr. 16, 2010

(65) Prior Publication Data

US 2010/0269050 A1    Oct. 21, 2010

Related U.S. Application Data

(60) Provisional application No. 61/169,892, filed on Apr. 16, 2009.

(51) Int. Cl.
*G06Q 30/02* (2012.01)

(52) U.S. Cl.
CPC .......... *G06Q 30/02* (2013.01); *G06Q 30/0243* (2013.01)

(58) Field of Classification Search
CPC ............... G06Q 30/0631; G06Q 30/0243; G06Q 30/02; G06F 17/30867
USPC .................. 715/744–745; 707/778
See application file for complete search history.

(56) References Cited

U.S. PATENT DOCUMENTS

| | | | |
|---|---|---|---|
| 5,704,017 A * | 12/1997 | Heckerman et al. | 706/12 |
| 5,835,087 A * | 11/1998 | Herz et al. | 715/810 |
| 5,884,282 A * | 3/1999 | Robinson | 705/7.33 |
| 6,014,638 A | 1/2000 | Burge et al. | |
| 6,029,195 A * | 2/2000 | Herz | 725/116 |
| 6,266,649 B1 * | 7/2001 | Linden et al. | 705/7.29 |
| 6,338,067 B1 * | 1/2002 | Baker | G06Q 20/201 379/115.01 |
| 6,448,980 B1 * | 9/2002 | Kumar et al. | 715/745 |
| 6,477,575 B1 * | 11/2002 | Koeppel | G06F 17/30867 705/14.64 |
| 6,615,247 B1 | 9/2003 | Murphy | |
| 6,718,315 B1 * | 4/2004 | Meek et al. | 706/12 |
| 6,954,901 B1 * | 10/2005 | Desai et al. | 715/745 |
| 7,346,858 B1 * | 3/2008 | Berg et al. | 715/853 |

(Continued)

FOREIGN PATENT DOCUMENTS

| | | |
|---|---|---|
| CN | 1485775 A | 3/2004 |
| CN | 101071424 A | 11/2007 |

(Continued)

OTHER PUBLICATIONS

Wikipedia, "Tree structure", http://en.wikipedia.org/wiki/Tree_structure printed on Jun. 14, 2014, printout pp. 1-6.*

(Continued)

*Primary Examiner* — Amy Ng
*Assistant Examiner* — William Wong
(74) *Attorney, Agent, or Firm* — Mannava & Kang, P.C.

(57) ABSTRACT

A web site accelerator system includes a web asset migrator storing web assets in a data repository according to categories specified in a predetermined schema. The system also includes a web asset configurer matching rules stored in the data repository with attributes associated with an online user. The rules each specify a condition and a web asset stored in the data repository to provide to the online visitor if the condition is satisfied. The system also includes a rules optimizer modifying the rules based on captured online behavior.

8 Claims, 7 Drawing Sheets

LOCATION

PRODUCT (56) References Cited

U.S. PATENT DOCUMENTS

| | | | |
|---|---|---|---|
| 7,349,890 B1 | 3/2008 | Pathak et al. | |
| 7,617,122 B2 | 11/2009 | Kumar et al. | |
| 8,170,912 B2 | 5/2012 | Bennett et al. | |
| 8,332,258 B1 | 12/2012 | Shaw | |
| 8,352,499 B2 | 1/2013 | Bharat et al. | |
| 8,850,362 B1* | 9/2014 | Khoshnevisan | G06F 17/30961 715/853 |
| 2002/0024532 A1* | 2/2002 | Fables et al. | 345/700 |
| 2002/0054089 A1* | 5/2002 | Nicholas et al. | 345/745 |
| 2002/0087660 A1* | 7/2002 | Martin | G06F 17/30861 709/218 |
| 2002/0095333 A1 | 7/2002 | Jokinen et al. | |
| 2002/0111852 A1* | 8/2002 | Levine | 705/14 |
| 2002/0112035 A1* | 8/2002 | Carey et al. | 709/219 |
| 2002/0130902 A1* | 9/2002 | Shaouy et al. | 345/745 |
| 2002/0133392 A1* | 9/2002 | Angel et al. | 705/10 |
| 2002/0173971 A1* | 11/2002 | Stirpe et al. | 705/1 |
| 2002/0178057 A1* | 11/2002 | Bertram et al. | 705/14 |
| 2002/0188598 A1* | 12/2002 | Myllymaki | 707/2 |
| 2002/0199190 A1 | 12/2002 | Su | |
| 2003/0090513 A1* | 5/2003 | Ramakrishnan | 345/744 |
| 2003/0128236 A1* | 7/2003 | Chen | 345/745 |
| 2003/0149623 A1 | 8/2003 | Chen | |
| 2003/0149937 A1 | 8/2003 | McElfresh et al. | |
| 2003/0154180 A1* | 8/2003 | Case et al. | 707/1 |
| 2003/0208399 A1* | 11/2003 | Basak et al. | 705/14 |
| 2003/0212619 A1 | 11/2003 | Jain et al. | |
| 2003/0217333 A1 | 11/2003 | Smith et al. | |
| 2004/0036716 A1* | 2/2004 | Jordahl | 345/713 |
| 2004/0064431 A1* | 4/2004 | Dorner et al. | 707/1 |
| 2004/0167796 A1 | 8/2004 | Lynch et al. | |
| 2004/0268388 A1* | 12/2004 | Roegner | 725/35 |
| 2005/0080902 A1* | 4/2005 | Parupudi et al. | 709/226 |
| 2005/0149460 A1 | 7/2005 | Tuzhilin et al. | |
| 2005/0193335 A1* | 9/2005 | Dorai et al. | 715/530 |
| 2005/0204276 A1* | 9/2005 | Hosea et al. | 715/501.1 |
| 2006/0095377 A1 | 5/2006 | Young et al. | |
| 2006/0175403 A1* | 8/2006 | Fossen McConnell et al. | 235/385 |
| 2006/0224447 A1 | 10/2006 | Koningstein | |
| 2006/0282283 A1 | 12/2006 | Monahan | |
| 2007/0027771 A1 | 2/2007 | Collins et al. | |
| 2007/0061412 A1* | 3/2007 | Karidi et al. | 709/217 |
| 2007/0265905 A1* | 11/2007 | Lazier | G06F 17/30035 705/7.29 |
| 2008/0005098 A1 | 1/2008 | Holt et al. | |
| 2008/0046267 A1 | 2/2008 | Romano et al. | |
| 2008/0097832 A1 | 4/2008 | Lee et al. | |
| 2008/0109306 A1 | 5/2008 | Maigret et al. | |
| 2008/0209350 A1* | 8/2008 | Sobotka et al. | 715/762 |
| 2009/0019354 A1* | 1/2009 | Jaiswal et al. | 715/224 |
| 2009/0063229 A1 | 3/2009 | Coladonato et al. | |
| 2009/0106100 A1 | 4/2009 | Mashinsky | |
| 2009/0276716 A1* | 11/2009 | Chua | 715/744 |
| 2010/0070566 A1 | 3/2010 | Vandewalle | |

FOREIGN PATENT DOCUMENTS

| | | |
|---|---|---|
| CN | 101208716 A | 6/2008 |
| JP | 2000-163477 A | 6/2000 |
| JP | 2001-256240 | 9/2001 |
| JP | 2001-282808 A | 10/2001 |
| JP | 2001-306934 A | 11/2001 |
| JP | 2001-351014 A | 12/2001 |
| JP | 2001-357058 A | 12/2001 |
| JP | 2002-366569 | 12/2002 |
| JP | 2003-511798 A | 3/2003 |
| JP | 2003-122787 A | 4/2003 |
| JP | 2003-132086 | 5/2003 |
| JP | 2003-216608 A | 7/2003 |
| JP | 2003-256707 A | 9/2003 |
| JP | 2003-529116 A | 9/2003 |
| JP | 2004-030571 A | 1/2004 |
| JP | 2004-062446 | 2/2004 |
| JP | 2004-504674 A | 2/2004 |
| JP | 2004-070504 | 3/2004 |
| JP | 2004-533047 | 10/2004 |
| JP | 2005-503598 A | 2/2005 |
| JP | 2005-517237 A | 6/2005 |
| JP | 2006-011676 | 1/2006 |
| JP | 2006-120135 A | 5/2006 |
| JP | 2006-519637 A | 8/2006 |
| JP | 2006-526853 A | 11/2006 |
| JP | 2007-500899 A | 1/2007 |
| JP | 2007-512621 A | 5/2007 |
| JP | 2007-517321 A | 6/2007 |
| JP | 2007-256992 | 10/2007 |
| JP | 2007-328496 A | 12/2007 |
| JP | 2008-502079 A | 1/2008 |
| JP | 2008-033927 A | 2/2008 |
| JP | 2008-094045 A | 4/2008 |
| JP | 2008-535094 A | 8/2008 |
| JP | 2008-225791 A | 9/2008 |
| JP | 2008-545200 A | 12/2008 |
| JP | 2009-503689 A | 1/2009 |
| JP | 2009-503701 A | 1/2009 |
| JP | 2009-508275 A | 2/2009 |
| JP | 2009-530722 A | 8/2009 |
| JP | 2010-508585 A | 3/2010 |
| JP | 2011511968 A | 4/2011 |
| KR | 20060100785 A | 9/2006 |
| KR | 20080087876 | 10/2008 |
| WO | 02-07054 A2 | 1/2002 |
| WO | 02-084503 | 10/2002 |
| WO | 2004/111771 A2 | 12/2004 |
| WO | 2005/013149 A1 | 2/2005 |
| WO | 2005/065229 A2 | 7/2005 |
| WO | 2005/116899 A2 | 12/2005 |
| WO | 2006/104854 A2 | 10/2006 |
| WO | 2007/002859 A2 | 1/2007 |
| WO | 2007/016042 A2 | 2/2007 |
| WO | 2007/016406 A1 | 2/2007 |
| WO | 2007/033365 A2 | 3/2007 |
| WO | 2007/109520 A2 | 9/2007 |
| WO | 2008/051807 A1 | 5/2008 |
| WO | 2009/045899 A2 | 4/2009 |

OTHER PUBLICATIONS

European Search Report and Written Opinion for Application No. EP 10 00 4091.4, European Patent Office, Aug. 9, 2010.

"Chinese Search Report on Application CN201010195983.0" in English language translation, Chinese Patent Office dated Feb. 5, 2013.

* cited by examiner

WEB SITE ACCELERATOR

PRIORITY

This application claims priority to U.S. provisional patent application Ser. No. 61/169,892, filed on Apr. 16, 2009, and entitled "Digital Platform", which is incorporated by reference in its entirety.

BACKGROUND

In today's digital age, users are bombarded with content and advertising, and users have many different options for accessing content of particular interest to them. Purveyors of goods and services have taken notice that users may be more responsive to customized marketing directed to users' interests rather than to generic information on sales. For example, if a user purchases goods through a web site retailer, the retailer may send emails to the user describing other goods or services that are related to the previously purchased goods or services because the retailer knows they may be of interest to the user.

Despite retailers taking notice of the benefits of customizing marketing, online retailers typically do not provide customized web sites for users. For example, companies often have web sites whereby users can learn more about products and services being offered for sale, and often users may purchase the products and services through the web sites. However, every user generally sees the same web sites, despite the interests of each specific user. Thus, a user may not spend the time to read through all the information on a web site to find the information or sale items that are of interest to the user, which may result in lost sales.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments. Also, embodiments may be used in combination with each other.

1. Overview

According to an embodiment, a system decomposes web sites into web assets and categorizes the web assets according to a predefined data schema. A web asset includes a component of a web page or any other form of online information. For example, web assets may include content such as text, video and images. Web assets may include buttons, drop down menus, tool bars, links, or other components that may be clicked on or interacted with by a user. Web assets may include JAVA scripts, flash scripts, style sheets, or other component of a web page. The categorized web assets are stored in a data repository according to the data schema.

The system is also operable to dynamically and intelligently repurpose the web assets according to assembly logic, which may implement optimization rules for composing a customized asset. The customized asset may be a web site or some other customized online content that may be accessed by users. For example, web assets are used to dynamically create web pages based on customer feedback, customer profiles, online sales, offline sales, etc. Through the dynamic and intelligent repurposing, the system automates the process of converting static web pages into 'optimization ready' web assets that can be recompiled based on the profile of the user.

The system performs many of the processes for global website design and localization and allows brand managers to create a brand template globally. Then local managers can modify the global template according to their local needs. The system greatly reduces time and effort for global rollout and ensures brand consistency and maximizes reuse.

2. System

Figure 1:
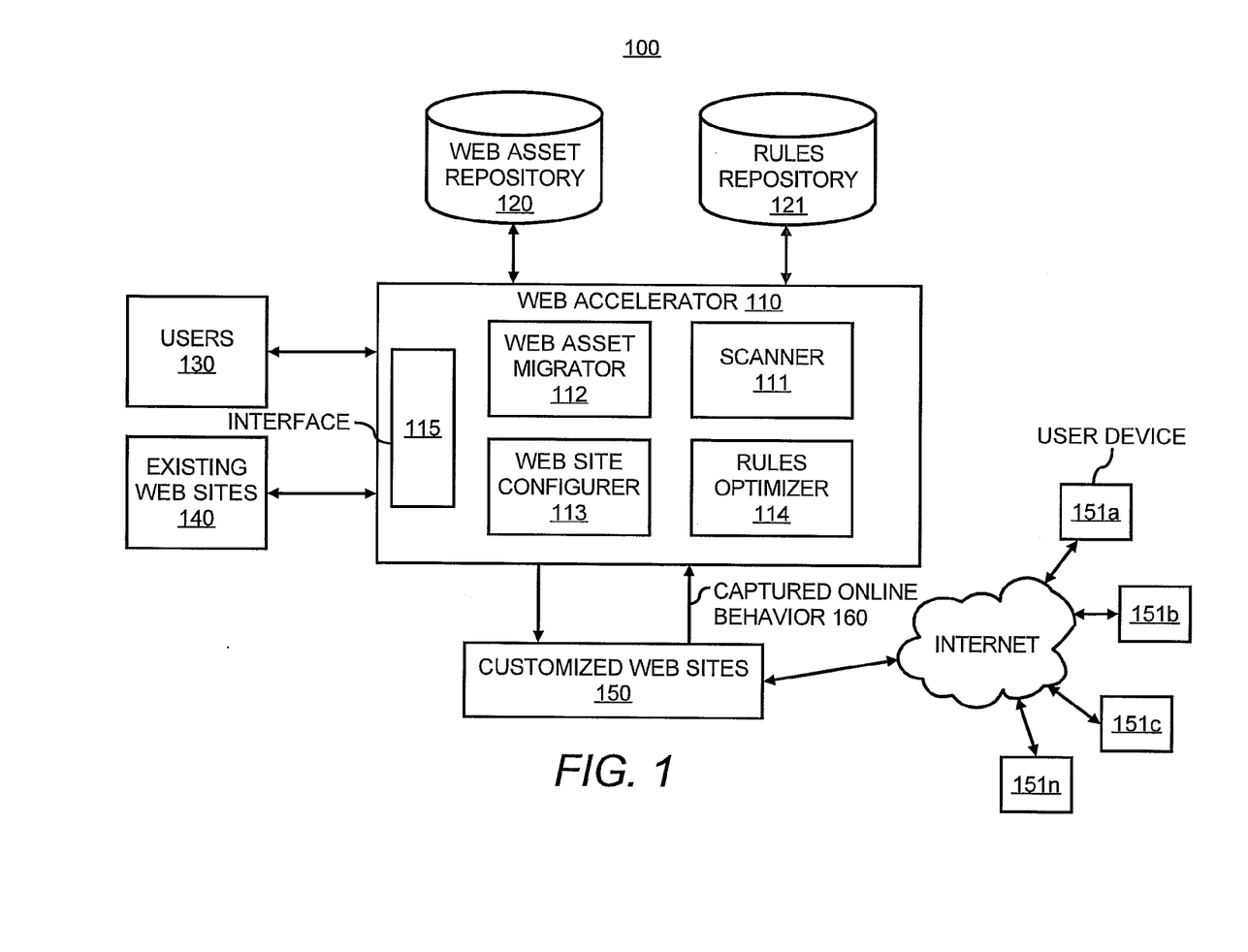
FIG. 1 illustrates a system, according to an embodiment.

FIG. 1 illustrates a system 100, according to an embodiment. The system 100 includes web site accelerator 110, web asset repository 120, and rules repository 121. The repositories 120 and 121 are data repositories and may include a database or other data repository system for storing data and for retrieving stored data. Also, the repositories 120 and 121 may include a single repository or multiple repositories. The web site accelerator 110 includes scanner 111 and web asset migrator 112. The scanner 111 scans existing web sites 140 to identify web assets in the web sites. Scanning includes scanning the HTML, JAVA scripts, flash scripts, or other web page code. Iframes are also scanned. Iframes are embedded HTML documents in a web page. Iframes are scanned recursively if an iframe contains another iframe. The HTML and scripts are parsed for each iframe. Parsing includes identifying any code that may be or include a web asset. This may including identifying individuals segments of code, such as HTML tags or scripts that may potentially include web assets. Conventional "web scraping" techniques may be used to extract the web assets from the existing web pages 140. Web assets may be identified from scanning or may be provided by users or other sources to the system 100.

The web asset migrator 112 categorizes the web assets identified by the scanner 111 and categorizes the web assets according to a predetermined schema. The schema may be stored in the web asset repository 120 and identifies the categories of web assets to be collected. The categories may include different object types, such as text, image, video, audio, JAVA script, flash script, style sheet, etc. The categories may include different categories for each object type. For example, under image, there may be categories for logo, product picture, etc. The web asset migrator 112 identifies attributes of web asset in order to determine the category for the web asset. The web asset may also include a tag that describes what it is, and the tag may be used to determine the corresponding category. Also, a user, for example, from users 130, may analyze the web asset and provide input to the web asset migrator 112 to identify the category for the web asset. The users 130 may include users authorized to enter and make changes to rules and customize web sites. The web assets are stored in the web asset repository 120 according to their category, and the web assets may be retrieved according to their category and/or based on other identifiers.

The web assets stored in the web asset repository 120 may also include page types and component parts. Page types are complete web pages. Examples of page types may include a contact us web page or a privacy statement page. The page types are also categorized. A component part includes multiple web objects. A web object may be considered the smallest granularity of a web asset, such as a single image or script. A component part may be a frame or other set of web objects. The web objects and component parts are categorized.

The rules repository 121 stores rules indicating when to apply web assets, and a web site configurer 113 of the web site accelerator 110 uses the rules to select web assets from the web asset repository for a customized web site. A rule may include one or more conditions and one or more web asset identifiers, which may include links to web assets in the web asset repository 120. The web site configurer 113 determines if the conditions specified in the rule are satisfied. If the conditions are satisfied, the web site configurer 113 determined web assets from the rule, and the web assets are implemented in a customized web site. In one example, the conditions in the rule include user attributes and product attributes. The identifiers in the rule include links to web assets or web asset categories stored in the web asset repository 120. If a web site visitor, also referred to as an online user, is identified as having the user attributes specified in a rule (i.e., the rule condition is satisfied), the web site configurer 113 identifies the links from the rule and uses the links to retrieve the corresponding web assets for creating a customized web page. If the link is to a category rather than a specific web asset, the web site configurer 113 selects a web asset from the category. Note that an online user is any user that consumes the customized web pages or any customized content generated by the system 100. The consumption may include viewing, playing or making use of the customized content.

The web site configurer 113 may generate code for a complete web page including the web assets identified from applicable rules in the rules repository 121. The code is sent to a web server to generate the customized web page. Customized web sites 150 include the customized web pages generated by the web site configurer 113. Users may use user devices 151a-n to access the customized web sites 150 via the Internet. The customized web sites 150 include web assets from the web asset repository 120 to optimize the online experience. The optimized online experience may include manipulated text, images, layout, style, and search results. For search results, content layout may be optimized based on style sheets stored in the web asset repository 120. Search results may also be optimized for sort order and filtering. Content editors may store new web assets in the web asset repository 120 to supplement any existing web assets. The content editors may map web assets to component parts also stored in the web asset repository 120.

The web site accelerator 110 may include a rules optimizer 114 that updates rules in the rules repository 121 based on feedback. For example, captured online behavior 160 from the customized web sites 150 may include user purchases in response to various customized web pages that were presented to the user or other captured behavior, such as click-throughs, etc. The rules optimizer 114 determines the customized web assets that are the most effective in achieving a sale or other desired online action based on the captured online behavior 160. The customized web sites 150 are analyzed to identify the web assets from the web asset repository 120 that were included in them. For example, the rules optimizer 114 determines that a particular image from the web asset repository is included in many of the customized web pages that were used to generate an online sale of a particular product. Then, rules for that particular product are modified by the rules optimizer 114 to include a link to the image in the web asset repository. For example, the condition in the rule specifies user attributes. It is determined from the analysis of the captured online behavior 160 that users having the user attributes specified in the rule are more likely to make an online purchase if a certain component part is presented in a web page. Then, the rule is modified to include a link to the component part, and the link is used to generate a customized web page for an online user having the attributes specified in the rule.

The rules optimizer 114 can perform web site optimization using ongoing parallel processes. A continuous learning process produces baseline data and fine tunes the mapping between web assets, user attributes, and audience segments. Also, the ongoing optimization process delivers the current optimal experience to each visitor to the web site. The system also analyses the data captured during the learning process, such as the captured online behaviour 160, and uses these findings to determine the best combinations of web assets, user profile attributes, and audience segments to achieve a desired outcome, such as increasing sales.

The web site accelerator 110 includes an interface 115 that allows the users 130 to input rules and schemas for categories and other information for the system 100. The interface 115 may include a graphical user interface. Also, the users 130 may use the interface 130 to further customize web sites. For example, the rules in the rules repository 121 may be used to generate a web page that meets the global requirements of a brand, such as the web page having a brand logo and predetermined color scheme. However, a local administrator may further customize a web page to meet local needs. For example, if it is determined that the local population prefers to see products manufactured locally first on a retailer web site, then the local administrator modifies the web site displayed for those local web site visitors to provide that product information first. The local administrator may automate this customization by generating and storing a rule in the rules repository 121 that displays the web assets for these products upfront on the web page or in the web site. Also, the web assets stored in the web asset repository 120 may include component parts that are frames or templates for web pages, which may be modified by the users 130.

The components of the web site accelerator 110 and other components of the system 100 may run on a single platform or multiple different platforms. The components may include software, hardware or a combination of hardware and software.

3. Dynamic, Hierarchal, Web Asset Taxonomy

Figure 2A:
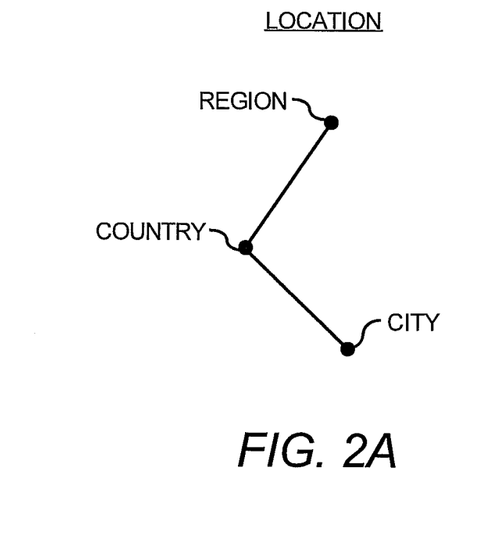
FIGS. 2A-B illustrate hierarchical taxonomies, according to an embodiment.
Figure 2B:
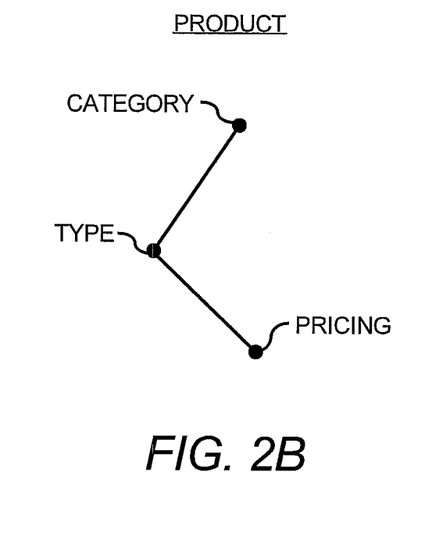

FIGS. 2A-B illustrate examples of hierarchical user attribute and product attribute taxonomies that may be used for storing web assets in the web asset repository 120 and for identifying applicable rules from the rules repository 121 for creating customized web pages. FIG. 2A shows a hierarchical taxonomy 200 for location, which is a user attribute. The hierarchical taxonomy 200 may include categories comprising regions, countries, and cities. Each category is in a different level of the hierarchy. A region may be at the highest level, and countries and cities are provided within a region. Country is at the next level, and cities are at the lowest level. When a visitor visits a web site, location information may be determined from the visitor's IP address or information provided from the visitor. This information is used to determine which region, country, and city the visitor is located. A rule in the rules repository 121 may specify the web assets to use for a customized web page for a user falling within the identified region, country and city.

FIG. 2B illustrates a hierarchical taxonomy 210 for a product attribute. The hierarchical taxonomy 210 may include categories comprising product category, product type, and pricing. Each category is in a different level of the hierarchy, similar to the hierarchical taxonomy 200 shown in FIG. 2A. An example of a product category may include electronic devices, and an example of a product type may include MP3 players. Pricing may refer to electronic devices falling within a price range, such as less than $50, less than $100, and less than $150.

The categories used in the hierarchical taxonomies 200 and 210 are also used in the web asset repository 120, so a single web asset may be stored under multiple categories by the web asset migrator 112. Also, additional hierarchical taxonomies other than 200 and 210 may be used for different user and product attributes and for other types of attributes. Also, the hierarchical taxonomies may be stored in the web asset repository 120. Each stored hierarchical taxonomy may include the attribute for the hierarchical taxonomy, such as location or product. Also, the stored hierarchical taxonomies may include the categories in each hierarchical taxonomy and level for each category.

As described above, the web site configurer 113 determines the applicable rules and identifies web assets to use for customized web pages by applying the rules. According to an embodiment, the web site configurer 113 determines the applicable rules by determining attributes for the user and/or for an applicable product. Then, hierarchies for the determined attributes are retrieved for example from the web asset repository 120. These hierarchies are overlayed to create a combined hierarchy that is used to identify applicable rules from the rules repository 121.

For example, a visitor visits an online retailer web site and searches for MP3 players. The hierarchical taxonomy for location is determined that is applicable to the visitor. Also, the hierarchical taxonomy for the MP3 player product is determined. These hierarchical taxonomies are combined.

Figure 3:
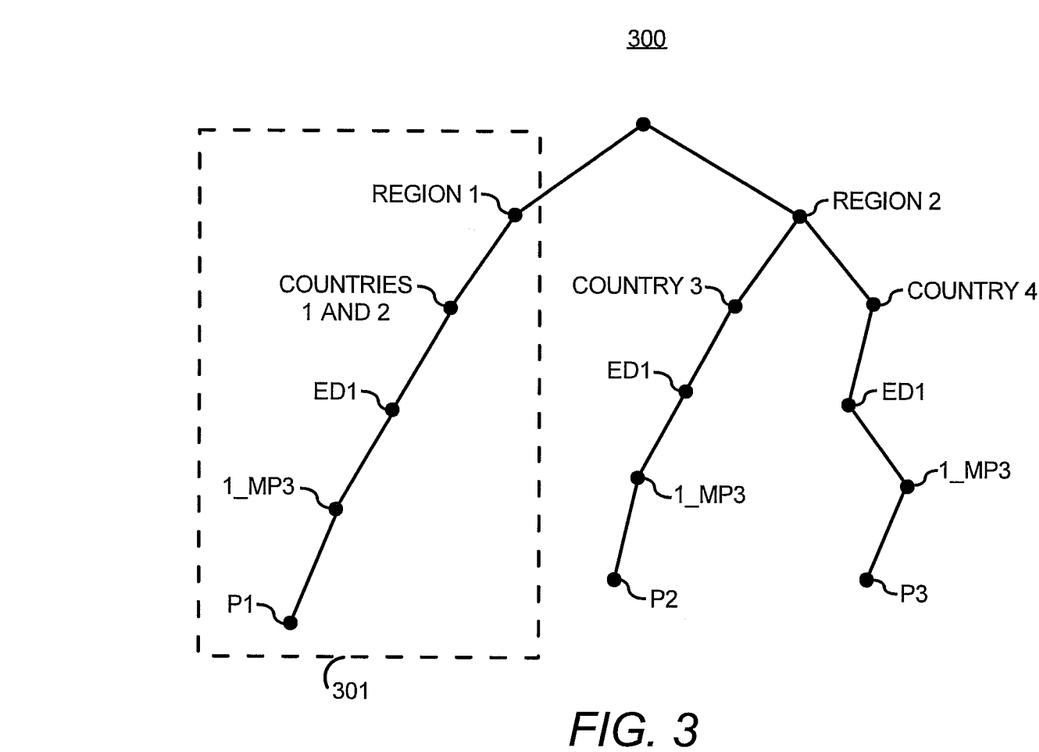
FIG. 3 illustrates a combined hierarchical taxonomy, according to an embodiment.

FIG. 3 shows a combined hierarchy taxonomy 300 including the instances of the location and product hierarchical taxonomies 200 and 210 that are combined. The combined hierarchy 300 includes branches for the region category, including regions 1 and 2. Regions 1 and 2 are instances of attributes in the region category. In a next level, countries 1-4 are shown. For countries 1 and 2, there is no distinction at the city level for electronic device products. Thus, the categories for the MP3 product are the same for countries 1 and 2. In particular, the electronic device category for countries 1 and 2 is shown as ED1, and the product type category for MP3 players is shown as 1_MP3. The pricing is shown as P1. The cities for countries 1-4 have the same pricing so the level for cities is not shown. Countries 3 and 4 may have different pricing, so different pricing, P2 and P3, is shown for countries 3 and 4. However, the electronic device category for countries 3 and 4 may be the same as countries 1 and 2, and is shown as ED1. Also, the product type category for MP3 players may be the same and is shown as 1_MP3.

After the combined hierarchy 300 is determined, the web site configurer 113 determines where the user falls in the combined hierarchy 300. For example, the user is a web site visitor from country 1 and is searching for MP3 players. The user falls into portion 301 of the combined hierarchy 300. Then, the web site configurer 113 identifies rules from the rules repository 121 that correspond to the portion 301 of the hierarchy. For example, rules from the rules repository 121 may include conditions. The conditions may include user and/or product attributes. If the user and product attributes specified in the rule match the rule and product attributes of the portion 301 (e.g., a web site visitor from region 1 and from country 1 or 2, and showing interest in MP3 players, within a pricing range P1), then the rule is applied. Applying the rule may include identifying links to web assets in the rule for generating a web page with the web assets. Then, the links are used to generate a customized web page. The web site configurer 113 is configured to identify any rules from the rules repository 121 that match with the portion 301 in this manner and apply those rules to generate a customized web page or other customized online content.

Hierarchical taxonomies for multiple different user and/or product attributes may be combined to determine matching rules in the rules repository 121 to apply. Also, the hierarchical taxonomies may be dynamic. For example, the hierarchical taxonomies may be modified and stored in the web asset repository 120. The modifications may be based on changing conditions. For example, new product types may be added as categories, or as data becomes available for new user attributes, new categories may be created for those user attributes.

4. Methods

Figure 4:
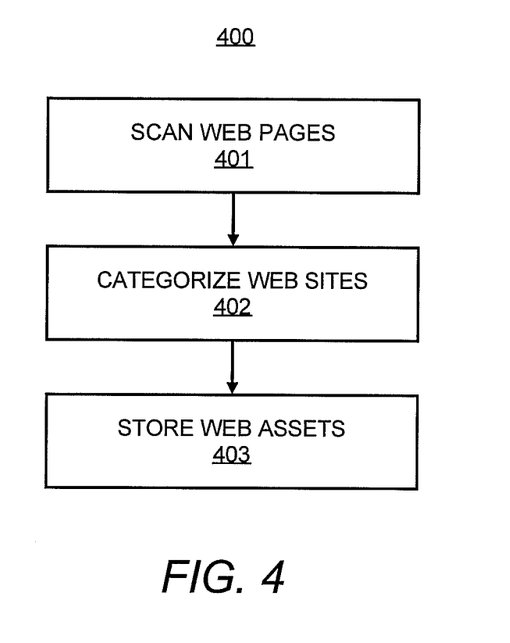
FIG. 4 illustrates a flow chart of a migration methodology for categorizing and storing web assets, according to an embodiment.

The methods described herein may be described with respect to the system 100 shown in FIG. 1 by way of example. The methods may be performed by other systems. FIG. 4 illustrates a migration methodology 400 for categorizing and storing web assets, according to an embodiment. At step 401, the scanner 111 shown in FIG. 1 scans one or more web pages from the existing web sites 140 to identify web assets. The scanning and other steps of the method 400 may be performed on a single web page or multiple web pages or multiple web sites to generate a web asset inventory.

At step 402, the web asset migrator 112 categorizes the identified web assets based on a schema. The web assets may include web objects, page types and component parts that are used to generate a customized web page or other customized online content, such as email assets, product elements, advertising media, and syndicated feeds.

At step 403, the web asset migrator 112 stores the web assets in the web asset repository 120. The stored web assets are stored according to their category. For example, the web asset repository may be a database that stores web assets under categories, which may be fields. The web assets may be searched and retrieved from the web asset repository 120. Each stored web object is classified in a category. Each web object is individually addressable from the web asset repository 120 by a unique ID or by category. Also, each web object is usable on multiple different web sites, and the web site accelerator 110 is configured to apply the web objects on multiple different web sites.

Figure 5:
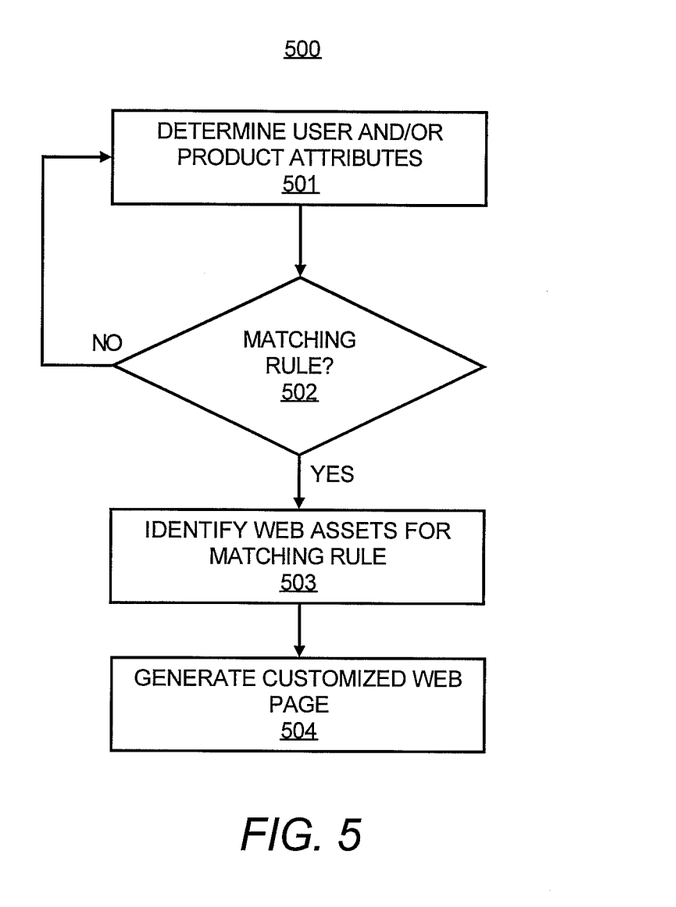
FIG. 5 illustrates a flow chart of a method for generating customized web pages, according to an embodiment.

FIG. 5 illustrates a method 500 for generating customized web pages, according to an embodiment. At step 501, the web site configurer 113 determines user attributes and/or product attributes for a user. The user may be a visitor to a web site. The user attributes may be determined from user profiles which are generated and stored in one of the repositories 120 or 121, and/or may be provided from an external source, and/or may be determined from metrics, such as IP address, received from the user's browser, and/or may be provided by the user. The product attributes may be attributes of a product of interest to a user. This may include a product the user is searching for or a product the user has indicated as being of interest to the user. The product may be identified, for example, by text from a search string entered by the user or may be expressly supplied by the user.

At step 502, the web site configurer 113 determines whether any rule stored in the rules repository 121 match the user and product attributes determined from step 501. The matching may include matching the user and product attributes determined from step 501 with user and product attributes in stored rules. One technique for matching is described above with respect to FIGS. 2A-B and 3 that utilizes hierarchical taxonomies. When using the hierarchical taxonomies for matching, the hierarchical taxonomies may be retrieved from the web asset repository 120 or some other repository. Many taxonomies may be stored in the repository. The attributes determined from step 502 may be used to determine the taxonomies to retrieve. For example, a taxonomy may be for an attribute class that include multiple categories. If information for the online user is known that falls into a class or category for a stored taxonomy, then that taxonomy is retrieved. The retrieved taxonomies identify the categories and levels for each taxonomy, such as shown in FIGS. 2A-B.

After the relevant taxonomies are retrieved, they are instantiated and combined. For example, FIG. 2A shows the categories for the location taxonomy. FIG. 3 shows the instantiated categories. For example, the region category includes regions 1 and 2, the country category includes countries 1-4, and so on. The instantiated taxonomies are combined, such as shown in FIG. 3. Then, the portion pertinent to the online user is identified and used to identify matching rules.

At step 503, the web site configurer 113 identifies web assets stored in the web asset repository 120 for the matching rules. For example, a matching rule may include a link to a web asset in the web asset repository 120. The rule may include links to multiple web assets stored in the web asset repository 120. Each web asset is retrieved and used for customizing the web site.

At step 504, the web site configurer 113 generates a customized a web page including the web assets identified at step 503 for the online user. The web site configurer 113 may place the web assets at particular locations on a web page as specified by the rules. For example, one web asset may be in the center, and another may be at the bottom.

The web assets are repurposable across many different web sites. Each web site may have different rules that apply the same or different web assets. Also, even if different web sites use the same web assets for the same online user, they may be arranged differently on each web page, and only a portion of the entire web page may use web assets that were used on a different web site. Also, different web sites may each have their own set of web assets that are particular to the web asset and my define the branding of the web site or company.

Figure 6:
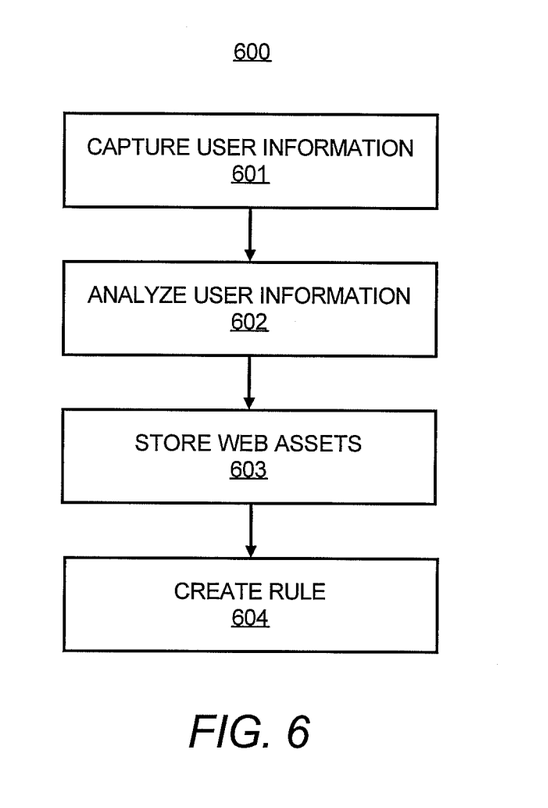
FIG. 6 illustrates a flow chart of a method for optimizing a web page, according to an embodiment.

FIG. 6 illustrates a method 600 for optimizing a web page according to an embodiment. At step 601, user information is captured. This may include the captured online behavior 160, information regarding online sales and offline sales, user profiles, etc.

At step 602, the captured information is analyzed to determine which web assets are best adapted to achieve a desired outcome. For example, the analysis may indicate that online users from a particular city in country 1 are more likely to purchase locally-manufactured goods. The analysis may be performed by the rules optimizer 114 and/or other external systems or by experts. The captured information may be captured from online behavior on multiple different web sites. This information is then usable to optimize web pages.

At step 603, web assets determined from the step 602 are stored in the web asset repository 120. The web assets may already be stored in the web asset repository 120 or the web assets may be generated. For example, a component part comprised of a set of web assets for a web page may be generated and stored. The component part comprises web assets that in combination are estimated to increase online sales.

At step 604, a rule is created for the web assets based on the analysis of step 602. For example, the rule identifies a class of user by including attributes of the class in the rule. The rule also includes a link to the web assets determined from step 602. The rule is then applied, for example, through steps 502-504 in the method 500. The created rule may be a new rule or an existing rule that is modified, for example, by changing a condition or a web asset specified in the rule.

Figure 7:
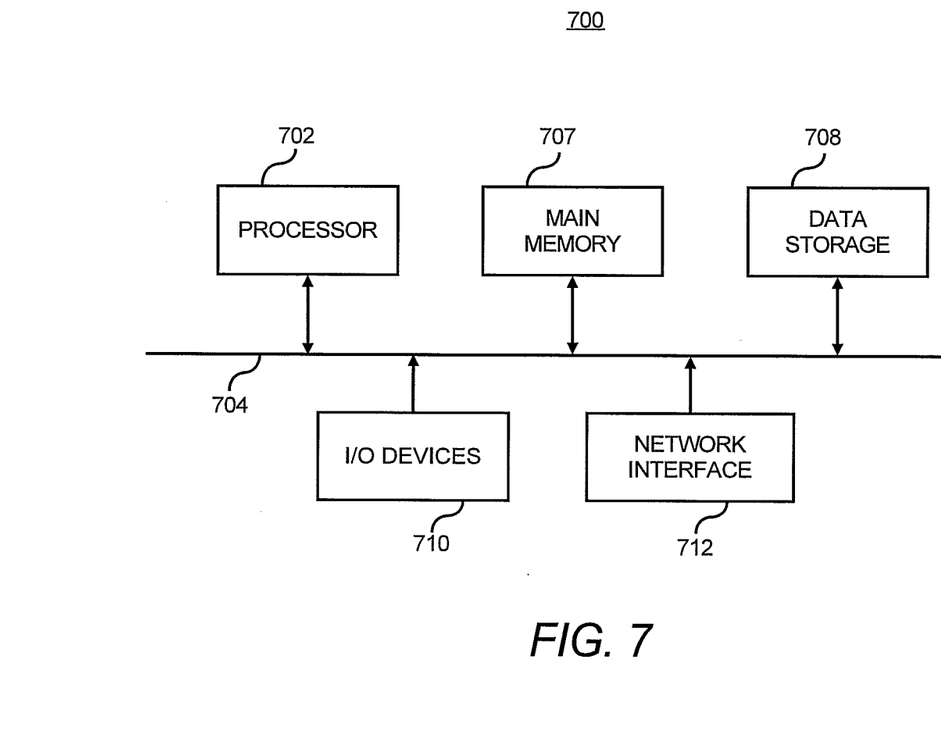
FIG. 7 illustrates a computer system that may be used for the methods and systems, according to an embodiment.

FIG. 7 shows a computer system 700 that may be used with the embodiments described herein. The computer system 700 represents a generic platform that includes components that may be in a server or other computer system. The computer system 700 may be used as a platform for executing one or more of the methods, functions and other steps described herein. These steps and functions may be embodied as software stored on one or more computer readable mediums. The computer system 700 is also a platform providing the components of the system 100. For example, one or more of the components of the web site accelerator 110 shown in FIG. 1 may include software hosted and executed by the computer system 100. In particular, one or more of the steps, functions and system components of the embodiments described herein may be implemented as computer code stored on a computer readable medium, such as the memory and/or secondary storage, and executed on the computer system 700, for example, by a processor, application-specific integrated circuit (ASIC), or other controller. The code may exist as software program(s) comprised of program instructions in source code, object code, executable code or other formats. Examples of computer readable medium include conventional computer system RAM (random access memory), ROM (read only memory), EPROM (erasable, programmable ROM), EEPROM (electrically erasable, programmable ROM), hard drives, and flash memory.

The computer system 700 includes a processor 702 that may implement or execute software instructions performing some or all of the methods, functions, and other steps described herein. Commands and data from the processor 702 are communicated over a communication bus 704. The computer system 700 also includes a main memory 707, such as a random access memory (RAM), where the software and data for processor 702 may reside during runtime, and a secondary data storage 708, which may be non-volatile and stores software and data. The memory and data storage are examples of computer readable mediums.

The computer system 700 may include one or more I/O devices 710, such as a keyboard, a mouse, a display, etc. The computer system 700 may include a network interface 712 for connecting to a network. It will be apparent to one of ordinary skill in the art that other known electronic components may be added or substituted in the computer system 700.

While the embodiments have been described with reference to examples, those skilled in the art will be able to make various modifications to the described embodiments without departing from the scope of the claimed embodiments. For example, the embodiments are generally described with respect to customizing web pages for an retailer web site. The embodiments may be used to customize web pages for web sites other than online retailers. Furthermore, the embodiments are not limited to customizing web pages. The web assets stored in the web asset repository 120 may include any digital objects that can be incorporated into electronic content that may be presented through the Internet or other channels. For example, the embodiments may be used to customize emails, text messages, search results, feeds, advertising, etc.

What is claimed is:

1. A web site accelerator system comprising:
   a processor; and
   a storage device storing software comprised of machine readable instructions to be executed by the processor, the processor to:
   store web assets according to categories specified in a schema in a data repository;
   store rules in the data repository, wherein each rule includes a condition and a link to a web asset of the stored web assets stored in the data repository;
   determine user attributes associated with an online user;
   determine product attributes associated with a plurality of products;
   determine a rule of the stored rules that matches the user attributes, wherein to determine the rule the processor is to:
     determine hierarchical user taxonomies for the user attributes;
     determine hierarchical product taxonomies for the product attributes;
     append instances of a hierarchical product taxonomy of the hierarchical product taxonomies to instances of the hierarchical user taxonomies to create a combined hierarchy;
     determine whether the online user falls into a portion of the combined hierarchy; and
     in response to a determination that the online user falls into the portion of the combined hierarchy, the processor is to
       identify the rule from the stored rules that corresponds to the portion of the combined hierarchy;
   generate a customized web page for the online user that includes the web asset linked to the rule, wherein to generate the customized web page, the processor is to identify the link from the rule to the linked web asset and use the link to retrieve the linked web asset stored in the data repository to create the customized web page for the online user; and
   modify at least one of the stored rules based on online behavior of users, wherein to modify at least one of the rules, the processor is to:
     capture the online behavior of users in response to customized web pages presented to the users;
     analyze the customized web pages to identify web assets of the data repository that are included in the customized web pages;
     determine, based on the analysis, at least one web asset of the identified web assets is included in a predetermined number of the customized web pages that were used to generate an online sale of at least one product of the plurality of products; and
     modify the at least one of the rules to include a link for the at least one web asset, wherein the at least one web asset comprises an image.

2. The web site accelerator system of claim 1 further comprising:
   a scanner to scan existing web sites to identify the web assets and the processor is to store the web assets from the existing web sites.

3. The web site accelerator system of claim 1, wherein the web assets include web objects, categorized page types and component parts.

4. An online web asset configuration method comprising:
   storing web assets according to categories specified in a schema in a data repository;
   storing rules in the data repository, wherein each rule includes a condition and a link to a web asset stored in the data repository;
   determining user attributes associated with an online user;
   determining product attributes associated with a plurality of products;
   determining, by a processor, a rule of the stored rules that matches the user attributes, wherein the determining of the rule includes:
     determining hierarchical user taxonomies for the user attributes;
     determining hierarchical product taxonomies for the product attributes;
     appending instances of a hierarchical product taxonomy of the hierarchical product taxonomies to instances of the hierarchical user taxonomies to create a combined hierarchy;
     determining whether the online user falls into a portion of the combined hierarchy; and
     in response to a determination that the online user falls into the portion of the combined hierarchy, identifying the rule from the stored rules that corresponds to the portion of the combined hierarchy;
   generating a customized web page for the online user that includes the web asset linked to the rule, wherein the generating of the customized web page includes identifying the link from the rule to the linked web asset and using the link to retrieve the linked web asset stored in the data repository for creating the customized web page for the online user; and
   modifying at least one of the stored rules based on online behavior of users, wherein the modifying comprises:
     capturing the online behavior of users in response to customized web pages presented to the users;
     analyzing the customized web pages to identify web assets of the data repository that are included in the customized web pages;
     determining, based on the analysis, at least one web asset of the web assets of the data repository is included in a predetermined number of the customized web pages that were used to generate an online sale of at least one product of the plurality of products; and modifying the at least one of the rules to include a link to the determined at least one web asset, wherein the at least one web asset comprises an image.

5. The method of claim 4, further comprising:
scanning existing web sites to identify the web assets from the existing web sites prior to storing the web assets.

6. The method of claim 4, wherein storing web assets further comprises storing web objects, page types and component parts.

7. A non-transitory computer readable storage device storing computer instructions that when executed by a computer system perform an online web asset configuration method comprising:
storing web assets according to categories specified in a schema in a data repository;
storing rules in the data repository, wherein each rule includes a condition and a link to a web asset stored in the data repository;
determining user attributes associated with an online user;
determining product attributes associated with a plurality of products;
determining a rule of the stored rules that matches the user attributes, wherein the determining of the rule includes:
determining hierarchical user taxonomies for the user attributes;
determining hierarchical product taxonomies for the product attributes;
appending instances of a hierarchical product taxonomy of the hierarchical product taxonomies to instances of the hierarchical user taxonomies to create a combined hierarchy;
determining whether the online user falls into a portion of the combined hierarchy; and
in response to a determination that the online user falls into the portion of the combined hierarchy, identifying the rule from the stored rules that corresponds to the portion of the combined hierarchy;
generating a customized web page for the online user that includes the web asset linked to the rule, wherein the generating of the customized web page includes identifying the link from the rule to the linked web asset and using the link to retrieve the linked web asset stored in the data repository for creating the customized web page for the online user; and
modifying at least one of the stored rules based on online behavior of users, wherein the modifying comprises:
capturing the online behavior of users in response to customized web pages presented to the users;
analyzing the customized web pages to identify web assets of the data repository that are included in the customized web pages;
determining, based on the analysis, at least one web asset of the web assets of the data repository is included in a predetermined number of the customized web pages that were used to generate an online sale of at least one product of the plurality of products; and
modifying the at least one of the rules to include the link to the determined at least one web asset, wherein the at least one web asset comprises an image.

8. The non-transitory computer readable storage device of claim 7, wherein the computer instructions are to cause the computer system to scan existing web sites to identify the web assets from the existing web sites prior to storing the web assets.

* * * * *